N. MININBERG.
PUFFED FOOD PRODUCT AND PROCESS OF PRODUCING THE SAME.
APPLICATION FILED JUNE 10, 1921.
1,426,756.
Patented Aug. 22, 1922.
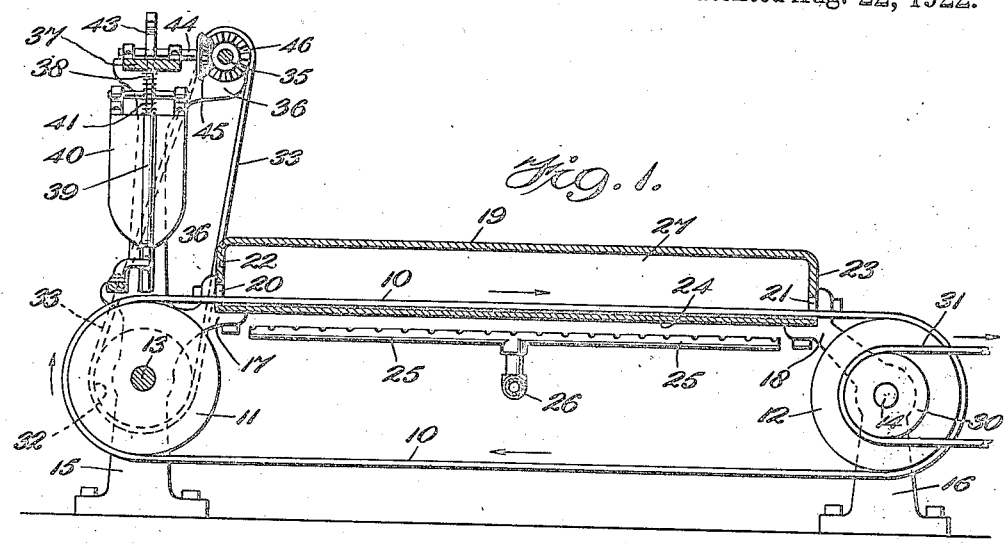
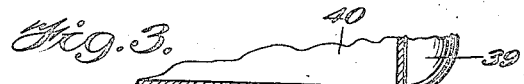
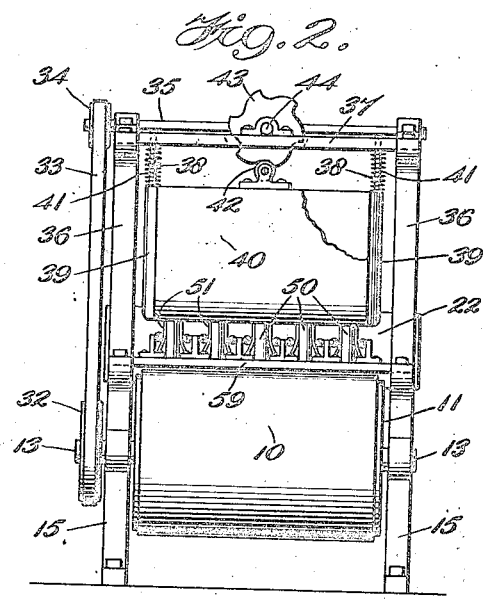
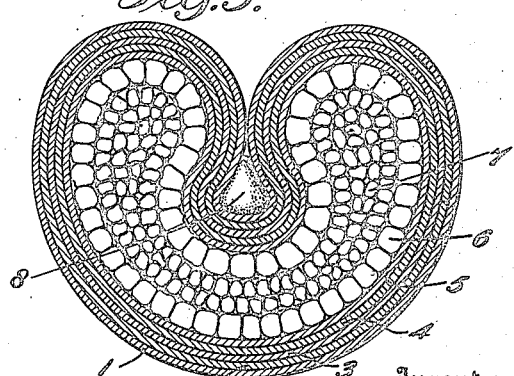
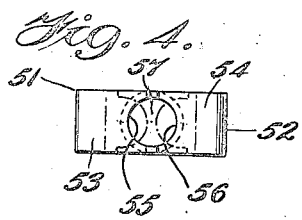
Inventor
Nathan Mininberg,
By J. A. Witherspoon
Attorney

UNITED STATES PATENT OFFICE.

NATHAN MININBERG, OF DICKINSON, NORTH DAKOTA, ASSIGNOR TO BRAN PRODUCTS COMPANY, OF DICKINSON, NORTH DAKOTA, A CORPORATION OF NORTH DAKOTA.

PUFFED FOOD PRODUCT AND PROCESS OF PRODUCING THE SAME.

1,426,758.

Specification of Letters Patent.   Patented Aug. 22, 1922.

Application filed June 10, 1921. Serial No. 476,513.

*To all whom it may concern:*

Be it known that I, NATHAN MININBERG, a citizen of the United States, residing at Dickinson, in the county of Stark and State of North Dakota, have invented certain new and useful Improvements in Puffed Food Products and Processes of Producing the Same; and I do hereby declare the following to be a full, clear, and exact description of the invention, such as will enable others skilled in the art to which it appertains to make and use the same.

This invention relates to food products and processes of producing the same, and has for its object to provide a new food which will be palatable, beneficial and nutritious, as well as a process of preparing the same which will be simple and comparatively inexpensive to carry out.

With these and other objects in view, the invention consists in the novel steps and combinations of steps constituting the process, and in the novel food product resulting therefrom, all as will be more fully disclosed below and particularly pointed out in the claims.

Referring to the accompanying drawings forming a part of this specification, in which like numerals designate like parts in all the views:

Figure 1 is a diagrammatic sectional elevational view of one form of apparatus suitable for carrying out a portion of the present process;

Figure 2 is an end elevational view of the parts shown in Figure 1, as seen from the left of said figure;

Figure 3 is an enlarged detail sectional view of one of the feeding tubes and its associated parts;

Figure 4 is an inverted plan view of the spring controlling members illustrated in Figure 3; and Figure 5 is an enlarged diagrammatic sectional view of a wheat grain or kernel.

In my copending application, Serial No. 463,957, filed April 23, 1921, entitled "Flaked food product and process of producing the same," I have disclosed a new bran food product composed of the three outermost layers of the wheat kernel suitably seasoned, cooked, flaked, and toasted. The present invention, on the other hand, contemplates the production of a puffed food in the nature and form of a bubble, which new food will likewise be composed of the three outer layers of the wheat kernel above mentioned, suitably cooked and puffed.

In carrying out the process forming part of the present invention, I first prepare in any suitable manner a flour composed of the outer layers 1, 2 and 3 and 6 of the wheat kernels, see Figure 5. The layer 1 is the outermost husk or "bran" layer, while the layers 2 and 3 are composed principally of nitrogenous material and certain complex salts of phosphorus and potassium. The layers 4 and 5 contain a cerealine substance which imparts color and flavor to the kernel, the layer 6 is mostly gluten, the layer 7 mostly starchy materials, and 8 is the germ, containing the easily soluble organic salts that supply vitality and first nourishment to the embryo plant.

After preparing the flour from the three outer layers of the wheat kernel, as above disclosed, I preferably reduce the temperature thereof to from 40° F. to 45° F. This cooling of the bran, I have found from actual experiment, later facilitates the formation of the dough from which the puffs are formed, giving it a more even consistency. The bran flour is next introduced in boiling water, in substantially the proportions of 1 part of bran to 4 parts of water, the mixture being continuously stirred to insure a thorough moistening and cooking of each individual particle of the solid matter.

The heating and stirring of the mass are continued until substantially 25% of the water has evaporated. It is then stopped and three parts of cold water are added, together with suitable condiments or flavoring materials such as sugar, salt, spices, etc. The mass is now cooled to between 130° and 160° F., resulting in a relatively thick, tough dough remarkably free from lumps. The dough is now ready to be puffed and this may be accomplished by suitably subdividing it into relatively small drops or pellets, and subjecting these to a temperature of substantially 600° F. for from 10 to 15 minutes.

The puffing operation may be conveniently carried out by employing the apparatus shown in Figures 1 to 4 of the drawings, wherein 10 indicates an endless belt, preferably of metal, passing around a pair of rolls 11 and 12, mounted respectively upon the shafts 13 and 14, journalled in the standards 15 and 16. The said standards are provided with the extensions 17 and 18, forming supports for a housing 19, having apertures 20 and 21 in its end walls 22 and 23 respectively through which the said belt 10 may pass. Suitably supported beneath the bottom 24 of the housing 19 is a heating element 25, here shown as a fluid fuel burner, which may be fed from a pipe 26, and which is adapted to raise the temperature within the chamber 27 enclosed by the said housing to the desired point.

The shaft 14 carries a pulley 30, around which passes a belt 31, connected to any suitable source of power, not shown, while the shaft 13 carries a pulley 32, adapted to supply power through a belt 33 and pulley 34 to a transverse shaft 35, journalled in the upward extensions 36 with which the standards 15 are provided. Secured between the extensions 36 is a cross bar 37, provided with the downwardly extending guide rods 38, which enter sockets 39 formed upon the ends of the receptacle 40. The said receptacle is resiliently hung upon the tension springs 41, surrounding the guide rods 38, the ends of the said springs being connected respectively to the receptacle 40 and the cross bar 37.

Mounted upon the top of the receptacle 40 is a roller 42, adapted to be engaged by a toothed wheel 43, carried by a jack shaft 44, upon which is mounted a bevel gear 45, meshing with a companion gear 46, carried by the transverse shaft 35, see Figure 1. It thus results that when the shaft 35 is rotated by means of the belt 33 and pulleys 32 and 34, the toothed wheel 43 will be revolved through its shaft 44, and the bevel gears 45 and 46, and its teeth will press down on the roller 42, thereby moving the receptacle 40 downwardly against the tension of the springs 41. When the depressions between the teeth of the wheel 43 register with the roller 42, the springs 41 will of course, return the receptacle 40 to its upper position, all for a purpose which will more fully appear below.

The bottom of the receptacle 40 is provided with a plurality of tubular outlets 50, discharging in close proximity to the traveling belt 10. Each of the tubes 50 has associated with it an automatic cut-off device, here shown as a pair of oppositely disposed spring leaves 51 and 52, provided with the bent portions 53 and 54, extending beneath the discharge end of the said tubes, and cut away as at 55 and 56, see Figures 3 and 4. Rollers 57 and 58, supported from a bar 59 rigid with the standards 15, bear against the spring leaves 51 and 52 respectively, and when the receptacle 40 is in its uppermost position, force the angularly disposed portions 53 and 54 across the mouths of the tubes 50, thereby cutting off passage therethrough. On the other hand, when the receptacle 40 is in its lowermost position, the leaves 51 and 52 spring outwardly, to the positions illustrated in Figure 3, and the cut away portions 55 and 56 form a substantially circular opening 57, see Figure 4, registering with the mouths of the tubes 50, and permitting the dough to pass therefrom.

The dough prepared as above described, is placed in the receptacle 40, substantially filling the same, and power being supplied to the belt 31, the said receptacle will be reciprocated up and down, in the manner above disclosed. As it moves downwardly, the spring leaves 51 and 52 will move outwardly, permitting the dough to pass down through the tubes and issue therefrom in the form of a small roll. As the hopper 40 moves upward again, the leaves 51 and 52 will be pressed together again by the rollers 57 and 58, thus cutting off the dough in the form of small tablets or pellets, which are deposited upon the travelling belt 10, which carries them into and through the puffing and drying chamber 27, where they are subjected to a temperature of approximately 600° F. for a period of from ten to fifteen minutes. The temperature and time may be varied somewhat without injuring the final product, but those above given have been found to produce very satisfactory results.

This heating will cause the moisture and air which are entrained in the dough to expand, which results in the pellets swelling up, somewhat after the manner of puffed wheat or rice, and when they finally emerge from the chamber 27, they are in the form of a palatable golden brown thin shell. They may be consumed in this state, if desired, or they may be further treated by placing them in a steam crisper and toasting them for a short time.

It is obvious that those skilled in the art may vary the steps constituting the process, as well as the ingredients and the exact proportions thereof employed in producing the product, without departing from the spirit of the invention, and therefore I do not wish to be limited to the above disclosure except as may be required by the claims.

What I claim is:—

1. The process of producing a puffed food product which consists in boiling a mixture of cereal bran and water to form a dough-like mass; cooling said mass; subdividing said mass into relatively small portions; and subjecting said portions to a temperature above 400° F. and not exceeding 700° F., whereby the air and moisture therein are caused to expand and puff said portions, substantially as described.

2. The process of producing a puffed food product which consists in boiling a mixture of cereal bran and water to form a dough-like mass; cooling said mass to below 165° F.; subdividing said mass into relatively small portions; and subjecting said portions to a temperature of substantially 600° F., whereby the air and moisture therein are caused to expand and puff said portions, substantially as described.

3. The process of producing a puffed food product which consists in providing a flour composed of the bran portion, the nitrogenous matter, and the phosphorus and potassium salts of a cereal grain; mixing said flour with water to form a dough-like mass; cooking said mass; cooling said mass; dividing said mass into relatively small portions; and subjecting said portions to a temperature of substantially 600° F., whereby the air and moisture therein are caused to expand and puff said portions, substantially as described.

4. The process of producing a puffed food product which consists in providing a flour composed of the bran portion, the nitrogenous matter, and the phosphorus and potassium salts of a cereal grain; mixing said flour with boiling water to form a dough-like mass; heating said mass; cooling said mass to below 165° F.; dividing said mass into relatively small portions; and subjecting said portions to a temperature of substantially 600° F., whereby the air and moisture therein are caused to expand and puff said portions, substantially as described.

5. The process of producing a puffed food product which consists in providing a flour composed of the bran portion, the nitrogenous matter, and the phosphorus and potassium salts of a cereal grain; cooling said flour to a temperature below 50° F.; mixing said flour with boiling water to form a dough-like mass; maintaining the temperature of the mass at substantially 212° F. until a substantial portion of said water has evaporated; adding cold water to said mass and cooling the same; dividing said mass into relatively small portions; and subjecting said portions to a temperature above 400° F. and not exceeding 650° F., whereby the air and moisture therein are caused to expand and puff said portions, substantially as described.

6. The herein described new food product comprising a puff in the form of a palatable thin shell composed of cereal bran having associated with it the nitrogenous portion of the cereal grain.

7. The herein described new food product comprising a puff in the form of a palatable thin shell composed of cereal bran having associated with it the phosphorus and potassium salts of the cereal grain.

In testimony whereof I affix my signature.

NATHAN MININBERG.